Patent number 4,630,344, Dec. 23, 1986 …

United States Patent
Boyle et al.

Patent Number: 4,630,344
Date of Patent: Dec. 23, 1986

[54] APPARATUS AND METHOD FOR ASSEMBLING PARTS

[75] Inventors: William B. Boyle, Cary, N.C.; Rodolfo Candelaria, Jr., Austin, Tex.; Edward P. Hecker, Coral Springs, Fla.

[73] Assignee: International Business Machines Corporation, Armonk, N.Y.

[21] Appl. No.: 756,197

[22] Filed: Jul. 18, 1985

[51] Int. Cl.$^4$ .................... B21D 53/10; B23P 19/02; B25J 15/00

[52] U.S. Cl. .................. 29/149.5 R; 29/428; 29/525; 29/724; 29/787; 29/790; 29/822; 294/93; 294/95; 414/739; 414/786; 901/15; 901/31; 901/39

[58] Field of Search ................ 29/149.5 R, 428, 525, 29/724, 787, 790, 822; 294/93, 95; 414/735, 786, 738, 739; 901/15, 31, 39

[56] References Cited

U.S. PATENT DOCUMENTS

| | | | |
|---|---|---|---|
| 2,222,605 | 11/1940 | Carlson | 29/724 |
| 4,050,136 | 9/1977 | Shultz | 29/724 |
| 4,173,368 | 11/1979 | Haverbusch | 294/88 |
| 4,273,505 | 6/1981 | Clark et al. | 414/735 |
| 4,340,249 | 7/1982 | Bucklew | 294/95 |
| 4,576,407 | 3/1986 | Lambert | 901/39 X |

*Primary Examiner*—Howard N. Goldberg
*Assistant Examiner*—R. S. Wallace

[57] ABSTRACT

Apparatus for assembling different size parts in a vertical assembly is provided which includes a pair of fingers attached to and extending from the gripper of a manipulator in parallel relationship and moveable toward and away from one another under control of the gripper. Different diameter curved outer sections extend around the periphery of and are stepped along the length of the fingers. The smallest diameter curved section is located at the outer end of the fingers and successively wider diameter sections are located along the fingers as the inner end is approached. One of the predetermined diameter sections has a predetermined slope, each part to be assembled has an opening therein of a diameter slightly larger than a diameter of a section of the fingers along the length thereof. The diameters of the curved outer sections are small enough, when said fingers are in closed position, to fit into the opening and to contact the inner surface diameter of the opening in said part to be assembled when the fingers are slightly moved away from each other. Each section is further selected in accordance with its position along the length of said fingers.

10 Claims, 5 Drawing Figures

VIEW A-A

APPARATUS AND METHOD FOR ASSEMBLING PARTS

FIELD OF THE INVENTION

The invention relates to apparatus and method for assembling parts by a manipulator which includes an end effector having multiple gripping surfaces for successively grasping and assembling a plurality of parts, and, more particularly, to an end effector of an automatic manipulator for gripping parts to be assembled through an opening therein.

BACKGROUND OF THE INVENTION

Parts assembly using the conventional grippers of the type which have facing gripping surfaces between which the part to be grasped is located cannot be conveniently used in certain assembly tasks where the parts to be assembled are to be stacked in a narrow casting. It will be appreciated that the fingers holding the part or component to be fully inserted in a slightly larger diameter opening will contact the casting or housing interfering with the insertion. Prior devices have been disclosed for overcoming this problem such as grasping means for picking up articles having openings therein, as shown in U.S. Pat. No. 4,273,505, which discloses an end effector for a robot, which includes an inflatable balloon member carried on the end of a tubular member which has a hollow center or conduit through which a suitable pressurized fluid is supplied. The tubular member is inserted within an opening in the part to be grasped and is inflated to provide the grasping. Likewise, U.S. Pat. No. 4,173,368 discloses apparatus for frictionally gripping the interior surface of a container during handling. The patent teaches applying air pressure to a cup causing a piston located therein to be driven downwardly causing straps to flex radially outwardly so as to frictionally grip the interior surface of a container or part to be grasped. Both patents require pneumatic means for operating the relatively complicated end effector in addition to the robot positioning means for locating the end effector in proximity to the interior surfaces to be gripped.

One solution to the problem of providing complicated adjustable size gripping means is to provide end effectors or tools which are readily changeable. That is, when a part of one size is to be inserted, a tool is picked up and automatically connected to the robot to perform the given task. A different size part will require a different size tool and, accordingly, the tool is automatically changed to fit the new task. An automatic tool changing mechanism is disclosed in U.S. application Ser. No. 565,444 filed Mar. 16, 1984.

SUMMARY OF THE INVENTION

Briefly, the invention consists of assembly apparatus which includes special shaped fingers for attaching to a gripper mechanism for assembling different size parts in a vertical assembly. The pair of fingers extend from the gripper and are moveable toward and away from one another under control of the gripper. These fingers have different diameter curved outer sections stepped along the length thereof, with the smallest diameter curved section located at the outer end of the fingers and successively wider diameter sections being located along the fingers as the other end is approached. The diameters of the different diameter curved outer sections are selected in accordance with the diameter openings in the parts to be assembled. The diameters of these curved outer sections are small enough once said gripper fingers are in the closed position to fit into and to contact the inner surface diameter of the opening in the part to be assembled when the fingers are moved away from one another.

One of the sections along the length of the fingers has an inward sloped surface sloping toward the outer end of the fingers. The diameter at the top of the slope is selected to be slightly larger than the diameter of the part to be assembled so that in the pick up movement, when the fingers are inserted into the opening in the part to be assembled, there will be a jam fit near the top of the slope sufficient to pick the part up when moved by the manipulator.

It is the main object of the invention to provide apparatus for assembling a plurality of different sized parts with a single end effector without requiring any additional operating mechanism or tool changing during assembly.

It is another object of the present invention to provide assembly apparatus capable of picking up the top one from a stack of thin rings, carrying the ring and releasing it.

BRIEF DESCRIPTION OF THE DRAWINGS

Other objects, features and advantages of the invention will be apparent to those skilled in the art from the following description of the preferred embodiment of the invention, wherein reference is made to the accompanying drawings, of which.

DESCRIPTION OF A PREFERRED EMBODIMENT

Figure 1:
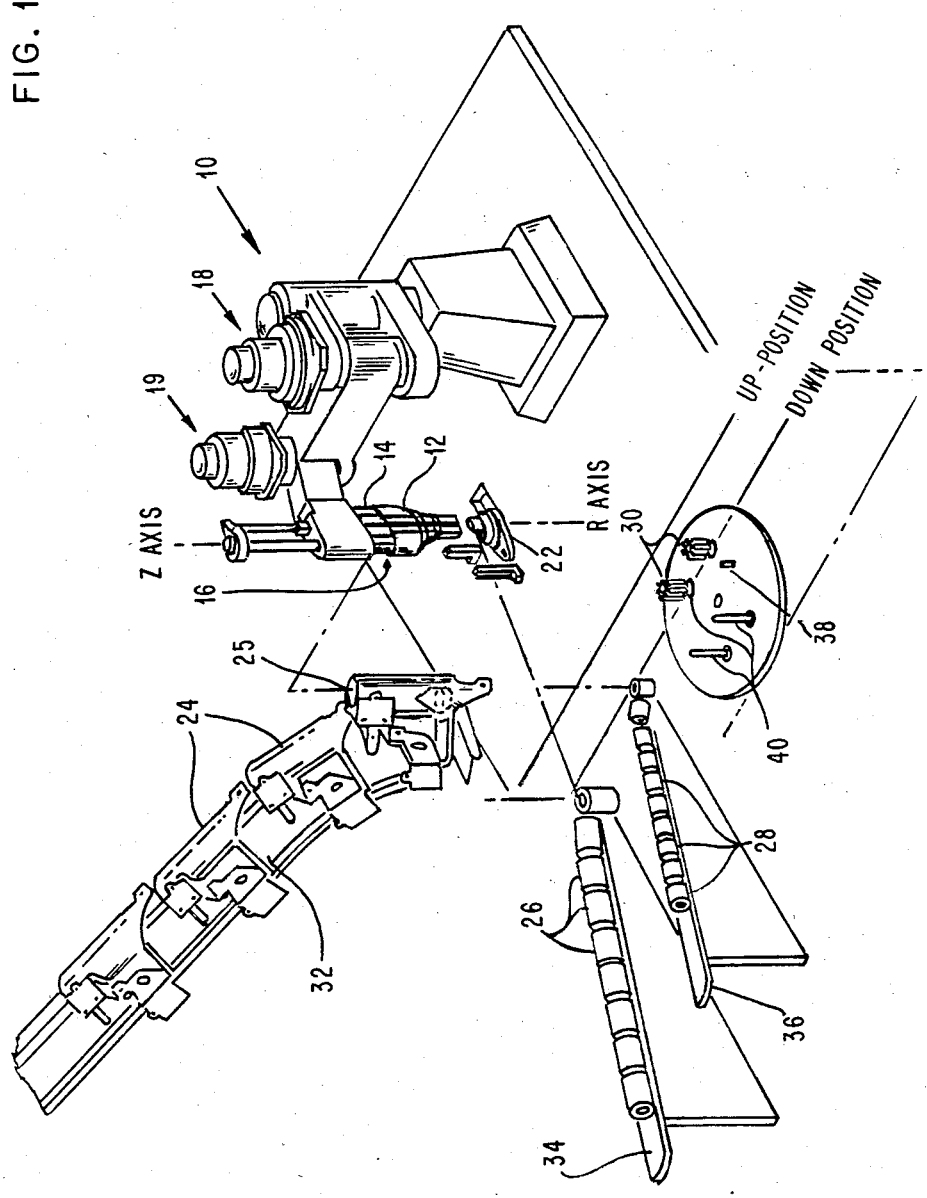
FIG. 1 is a perspective view showing the assembly apparatus of the present invention.

The assembly apparatus, including the manipulator 10 for operating the multi-shaped end effector 12 fingers, is attached to the fingers 14 of the gripper 16. The end effector 12 and gripper 16 are adapted for vertical movement along the Z-axis of the robot (up and down). The manipulator 10, shown in FIG. 1, is a two-jointed arm structure with four degrees of freedom. The joints of the arms, 18 and 19, called the T1 and T2-axis respectively, provide two degrees of freedom through their swivel motion. End-of-arm rotation is obtained providing a third degree of freedom. A fourth degree of freedom is provided consisting of an up and down position motion along the Z-axis. Electric motors provide the power for the swivel motion, a stepper motor, located below the T1-axis, provides the drive for the rotational motion of the R-axis through a belt system.

An external air supply, not shown, drives the air cylinder 20 used to raise and lower the gripper along the Z-axis. The Z-axis has two positions an up, and a down position.

The end effector fingers 12 are connected to the fingers 14 of the gripper 16 which is attached to the Z-axis.

An assembly fixture 22 is shown within the work envelope of the manipulator 10. This fixture is utilized to hold and provide a mounting location for the parts to be assembled.

In this embodiment the various parts to be assembled form what is known as the carrier assembly for a line matrix printer. The parts consist of a casting 24, two bearings 26, a spacer 28 and a pair of retaining rings 30.

The castings 24 into which the other parts are assembled are shown being fed on a feeder 32 which ultimately positions the bottom casting 24 such that it has the narrow opening 25 facing upward. The end effector 12 is positioned by the manipulator 10 above the bottom casting 24 and then lowered along the Z-axis causing the end effector 12 to enter the opening 25 in the casting. The fingers of the end effector 12 positioned therein are moved away from one another grasping the inside surface of the opening 25 so the part can be picked up. Similarly, the bearings 26 are brought into position by a bearing feeder 34 so that they can be picked up by the manipulator 10. A further feeder 36 is utilized for feeding the spacers into the work space where they can be picked up by the manipulator 10. A rotary type feeder 38 with a number of different pick up positions 40 thereon is utilized to hold the retainers 30 which are small rings for retaining the assembled parts in the casting 24.

Figure 2:
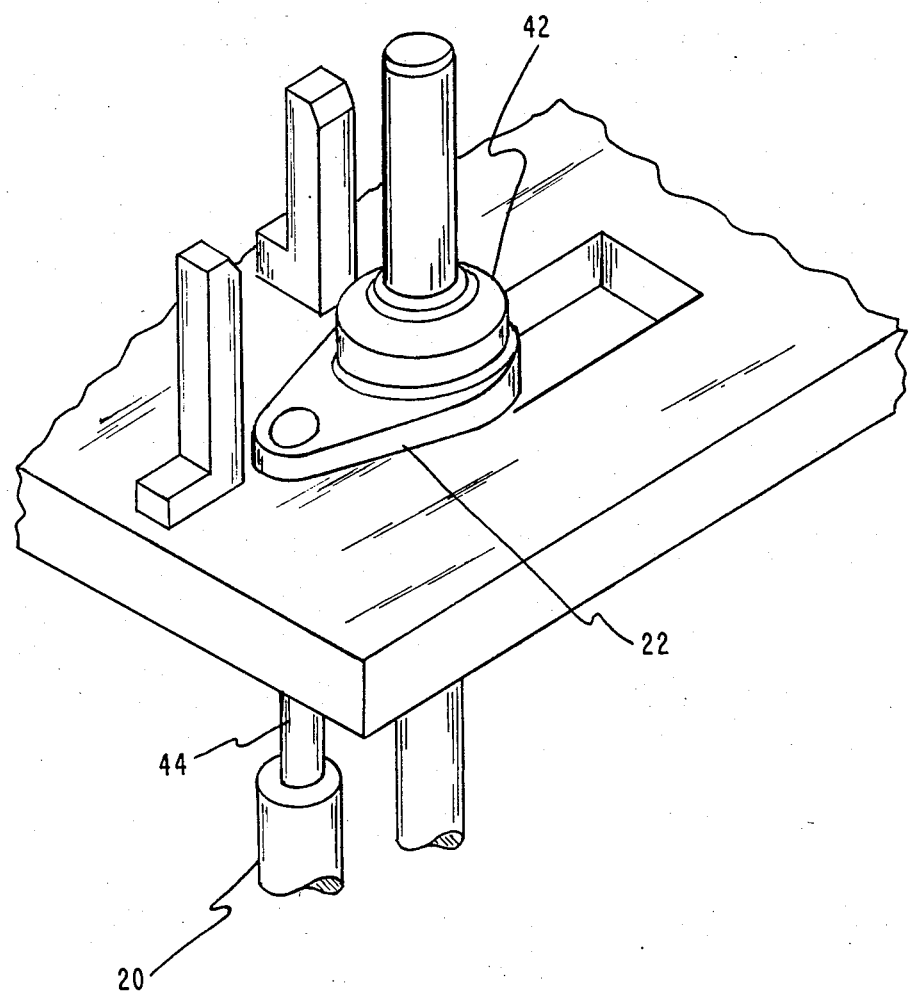
FIG. 2 is a further perspective view showing the assembly fixture in more detail.
Figure 3:
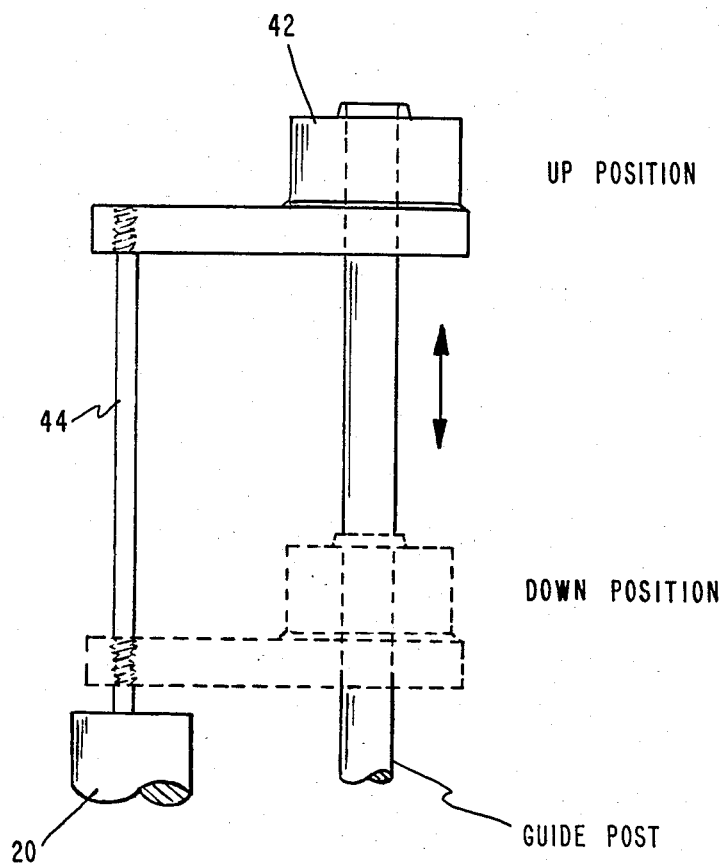
FIG. 3 is a side vertical view of the assembly fixture indicating the up and down position of the base sleeve provided by the operation of the air cylinder.

FIG. 2 shows the assembly fixture 22 in more detail. This fixture consists of a base sleeve 42 which can be positioned up or down as indicated in FIG. 3. An air cylinder 20 causes a screw rod 44 to turn through a threaded hole in the base sleeve 42 causing the base sleeve to position up and down. It is necessary in some instances to bring the base sleeve 42 up to the top position which is the lower most position of the manipulator 10 so that a part held by the manipulator can be positioned directly on the base sleeve 42 which is then lowered into the down position.

Figure 4:
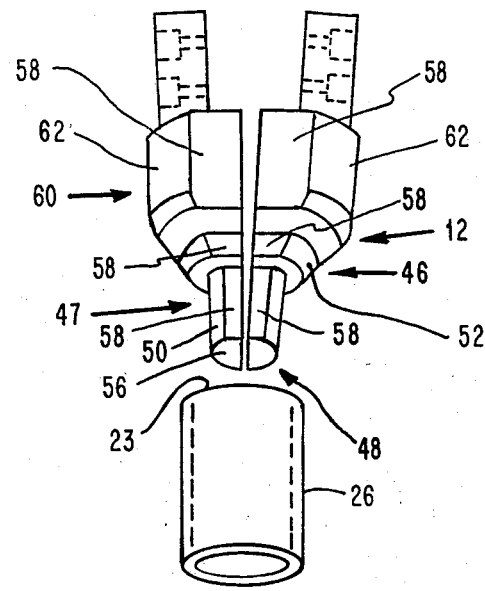
FIG. 4 is a perspective view showing the multi-shaped fingers forming the end effector adapted for attachment to the gripper of the manipulator.
Figure 5:
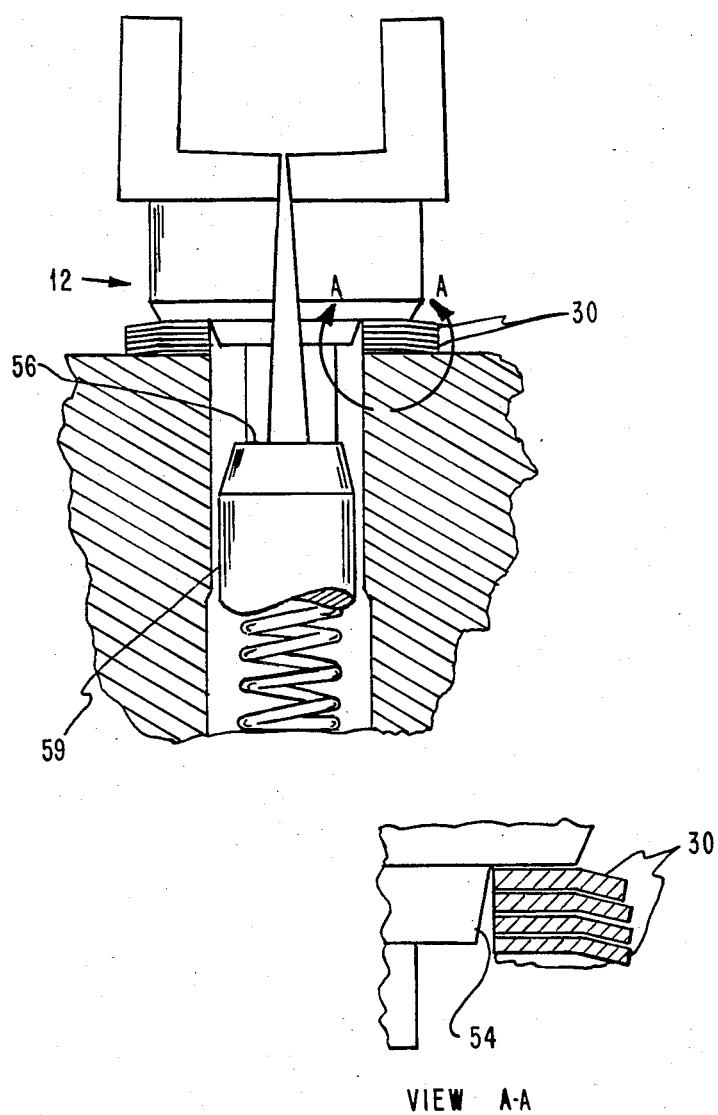
FIG. 5 is a partially crossed sectioned vertical view showing the multi-shaped fingers end effector picking up the top ring from a stack of rings.

The end effector 12, shown in FIG. 4, consists of two fingers 46 and 47 each having a flat facing surface and curved outward facing surfaces which are arranged in steps or sections of different diameters, for example, the outer or end section 48 of the fingers 46 and 47 have a curved outer surface 50 of a relatively small diameter such that the end section 48, when the fingers 46 and 47 are closed, can fit into a small diameter opening such as the opening in the bearings 26 and spacers 28 to be assembled. Of course, the diameters are machined into the sections of the end effector 10 or tool in accordance with the approximate size of the opening in the parts to be grasped and assembled. The diameter of the end section 48 of the fingers 46 and 47 is made a little smaller than the opening 23 into which it is to be fitted so that the fingers can be spread when inserted and the curved outer surfaces 50 form the gripping or contact surfaces to grip the part to be assembled. The mid section 52 along the length of the fingers 46 and 47 has a larger diameter than the end section 48 and has a shorter extent along the length of the fingers than the end section. Also. this mid-section 52 of the fingers 46 and 47 has a downward inward slant sloping toward the end section 48. The diameter of this section 52 is selected such that the top or wider diameter end of the section is such as to form a jam fit with a ring placed thereon as shown in FIG. 5.

This sloped surface 52 is used to pick up the top ring such as a retaining ring 30 from a stack of rings. The slope of the section 52 and the diameter of the top of the section are selected with respect to the diameter of the rings 30 to be picked up such that a jam fit exists between the sloped surface and the top retaining ring 30 as shown in FIG. 5. It will be appreciated, that the sloped surface section 52 is capable of picking up the top ring in a stack of rings 30 each time the end effector 12 or tool is positioned within the opening of the rings 30. The bottom surface 56 of the end effector 12 presses on a spring-loaded post 59 to limit the pressure applied to the stack of rings 30 by the end effector 12.

It can be seen from FIG. 4, that the end effector or tool 12 is adapted for screw attachment to the standard two finger gripper 16 as is found on the the 7535 IBM Manipulator.

The single ring 30 that is friction held on the inwardly sloped surface of the mid section 52 of the end effector 12 is dropped from the surface or is released therefrom by causing the end effector fingers 46 and 47 to approach one another slightly. As can be seen in FIG. 5, the fingers 46 and 47 of the end effector 12 do not contact each other when in the pick up position. Therefore, bringing the fingers together slightly will cause the ring to drop therefrom.

The end effector 12 has a flat surface 58 on either side of each section 48, 52 and 60 of the end effector 12. These flat surfaces 58 are in a plane which is at right angles to the facing surfaces of the fingers. These flat surfaces 58 are placed there to prevent the part from being held frictionally when the two fingers are brought together to release the part being held thereby. This is especially important in connection with the retaining rings 30 since the lack of the flat surfaces 58 would definitely provide a jam friction fit against the curved surface which might very well prevent the release of the ring when the fingers are brought together.

The fingers 46 and 47 of the end effector 12 have a further or third grasping surface which is located at the top of the end effector. The outwardly facing contacting surface 62 has a diameter which is larger than the two lower sections 52 and 48 so that it can pick up larger diameter parts. The diameter of this section 60 is selected in accordance with the diameter of the opening 25 in the casting 24 which is utilized for the assembly. It sould be appreciated that the diameter of this section 60 is sufficiently small relative to the diameter of the opening 25 in the casting 24 to be grasped such that the section fits within the opening within the casting and surfaces 62 thereof will grasp the casting when the fingers 46 and 47 are opened slightly. The casting 24 can be released by causing the fingers of the end effector 12 to move toward one another thus releasing the part.

In operation the assembly is performed in sequence under control of the manipulator program as follows:
1. The manipulator picks up a single retaining ring 30 from one of two stacks of retaining rings.
2. The air cylinder 20 associated with the assembly fixture 22 is energized and the base sleeve 42 is raised.
3. The manipulator places the retaining ring 30 held on the end effector 12 on the raised sleeve 42.
4. The air cylinder 20 is energized to return the sleeve 42 to the lower position.
5. The manipulator is positioned and the end effector grasps the inner diameter surface of the bearing 26.

6. The manipulator places the bearing 26 on the post of the assembly fixture 22.
7. The manipulator is positioned and the end effector 12 grasps the inner diameter surface of the casting.
8. The pick up of the casting is sensed and the escape machanism feeds a single casting for the next assembly.
9. The manipulator places the casting 24 on the assembly fixture 22 over the bearing 26 on the post and presses down to lock the lower retaining ring 30 in position in the casting.
10. The manipulator is positioned and the end effector 12 grasps the inner diameter of the spacer 26.
11. The manipulator is positioned and places the spacer 28 in the casting 24.
12. The manipulator is positioned and the end effector grasps the inner diameter of the second bearing 26.
13. The manipulator inserts the second bearing 26 into the casting 24.
14. The end effector picks up a single retaining ring 30 from the second of the two stacks of retaining rings.
15. The manipulator places and inserts the final retaining ring 30 into the casting 24.
16. The air cylinder 20 associated with the assembly fixture 22 is energized while the manipulator is still in the Z-axis down position.
17. The manipulator and end effector remove the assembled casting 24 by grasping the inner diameter of the assembly and moving to the Z-axis up position.
18. The air cylinder 20 on the assembly fixture 22 returns the base sleeve 42 to the down position.
19. The manipulator deposits the completed assembly where directed.
20. The steps 1–19 are repeated until sensors detect that the feeders are empty.

The resulting stack of assembled parts results in a four-inch tall stack inside of a six-inch long casting. The three-inch stroke offered on the standard IBM 7535 Manipulator is utilized. The assembly fixture 22 helps position the odd-shaped casting 24. The assembly fixture 22 includes a four-inch stroke air cylinder 20 which enables the manipulator to place the bottom part of the stack (the lower retaining ring 30) at a point four inches below the robots Z-axis down position. The remaining parts are either dropped or pressed into the casting.

It should be appreciated that the stack of six separate components is accomplished without a tool change operation. The handling of the four differently shaped parts 24, 26, 28 and 30 is accomplished with the multi-diameter pair of fingers 46 and 47. Each part is grasped by making contact between the internal surfaces of an opening in the part and a particular diameter section along the length of the pair of fingers 46 and 47. The desired diameter section of the fingers to perform the pick-up operation is selected by positioning the end effector 12 along the Z-axis before moving the finges away from one another to produce the grasping.

While there has been described what is at present considered to be a preferred embodiment of this invention, it will be obvious to those skilled in the art that various changes and modifications may be made therein without departing from the invention.

What is claimed is:
1. Apparatus for assembling different size parts in a vertical assembly using a manipulator having a gripper attached thereto, said parts to be assembled each having an opening therein of a diameter slightly larger than a diameter of a section of fingers on said gripper, said apparatus comprising;
   a pair of said fingers attached to and extending from said gripper in parallel relationship and movable toward and away from one another under the control of said gripper;
   different diameter curved outer sections extending around the periphery of and stepped along the length of said fingers, the smallest diameter curved section located at the outer end of the fingers and successively wider diameter sections located along the fingers as the inner end is approached;
   one of said predetermind diameter sections having a predetermined slope;
   the diameters of said curved outer sections being small enough when said fingers are in closed position to fit into said opening and to contact the inner surface diameter of the opening in said part to be assembled when the fingers are slightly moved away from one another by said gripper;
   said section and its diameter being further selected in accordance with its position along the length of said fingers.

2. An apparatus according to claim 1, wherein said one of said predetermined diameter sections has an inward sloped surface sloping toward the outer end of the fingers, the diameter at the top of the slope is selected to be slightly larger than the diameter of the part to be assembled so that in the pickup movement when the fingers are inserted into the opening in the part to be assembled there will be a jam fit near the top of the slope.

3. An apparatus according to claim 2, wherein said part to be assembled is a thin retainer ring, a stack of thin retainer rings, said part to be assembled being the top one of said stack of retainer rings, said fingers picking up the top retainer ring only when the manipulator performs the pick up movement.

4. An apparatus according to claim 3, wherein said stack of retainer rings surrounds a spring loaded piston against which the bottom of the pair of fingers press thereby limiting the force of the jam fit between the top thin retainer ring and the fingers.

5. An apparatus according to claim 4, wherein said spring and piston are sufficiently long to provide the limiting spring force for the pickup of each thin retainer ring in the stack.

6. An apparatus according to claim 1, wherein an assembly fixture is provided within the workspace of said manipulator, a guide post extending vertically from said assembly fixture, a base sleeve slideably attached to said guide post, a pneumatic cylinder located below said assembly fixture and having an opening in said assembly fixture thru which a piston passes when actuated by said pneumatic cylinder to raise and lower said base sleeve on said guide post.

7. An apparatus according to claim 1, wherein the parts to be assembled consists of a casting having an elongated tubular opening therein, a retainer ring and a first bearing fitted and locked into said casting by said retainer ring, a spacer, a second bearing and, a further retainer ring for locking said parts into said casting.

8. An apparatus according to claim 7, wherein said predetermined diameter section having said predetermined slope picks up said retainer rings, a smallest diameter outer curved section at the end of said fingers away from said gripper for picking up said bearings and said spacer, and the widest diameter curved outer section at the top of said fingers providing the contact surface for picking up said casting.

9. Apparatus according to claim 1, wherein two stacks of retainer rings are provided, one retainer ring is picked up and placed on an assembly structure, a casting having a vertical opening therein, said manipulator placing said casting on said assembly structure so that the retainer is locked into the bottom of said vertical opening in said casting, the parts to be assembled are picked up and placed in the casting opening, a second retainer ring is picked up from the second stack of retainer rings and placed in the top of said casting vertical opening in locked condition so that said parts are locked into said vertical opening in said casting.

10. A method for automatically assembling different size parts using a manipulator having a gripper with multi-shaped fingers extending therefrom and an assembly fixture located within the work space of said manipulator having a pneumatic cylinder for raising and lowering a base sleeve along a guide post comprising the steps of: 1, picking up a retainer ring from a stack of retainer rings by means of said pair of fingers; 2, raising said base sleeve on said guide post by means of said pneumatic cylinder; 3, placing said retainer ring on said base sleeve; 4, lowering said base sleeve on said guide post by means of said pneumatic cylinder; 5, inserting the pair of fingers into a first bearing a selected distance and opening said fingers so that the outer curved surfaces of said selected sections contact the inner diameter of the opening in the first bearing and placing the bearing on the guide post; 6, inserting the fingers into the opening in the casting and grasping the casting by opening the fingers and placing the casting in the assembly fixture over the bearing on the post and locking the first retainer ring in position; 7, grasping the inner diameter surface of the spacer and placing it in the casting; 8, grasping the inner diameter of the second bearing and placing it into the casting; 9, picking a second retainer ring from a second stack of retainer rings and inserting it into the casting. 10, firing the air cylinder on the assembly fixture to raise the base sleeve thereby pushing the casting onto the fingers of the manipulator which fingers grasp the inside diameter of the assembly fixture while moving to the up position; 11, moving the base sleeve down via the down operation of the pneumatic cylinder so that the casting can be moved and deposited by said manipulator.

* * * * *